(12) United States Patent
Yamauchi

(10) Patent No.: US 11,594,988 B2
(45) Date of Patent: Feb. 28, 2023

(54) MOTOR CONTROL DEVICE

(71) Applicant: DENSO CORPORATION, Kariya (JP)

(72) Inventor: Syunji Yamauchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 198 days.

(21) Appl. No.: 17/009,869

(22) Filed: Sep. 2, 2020

(65) Prior Publication Data

US 2021/0075349 A1    Mar. 11, 2021

(30) Foreign Application Priority Data

Sep. 5, 2019   (JP) .............................. JP2019-162333

(51) Int. Cl.
*H02P 7/00* (2016.01)
*G01D 18/00* (2006.01)
*G01D 5/16* (2006.01)

(52) U.S. Cl.
CPC ............. *H02P 7/0094* (2013.01); *G01D 5/16* (2013.01); *G01D 18/00* (2013.01)

(58) Field of Classification Search
CPC ........ H02P 7/0094; G01D 5/16; G01D 18/00; G01D 3/0365
USPC ......................................... 318/721, 720, 700
See application file for complete search history.

(56) References Cited

U.S. PATENT DOCUMENTS

| | | | | |
|---|---|---|---|---|
| 5,617,000 A * | 4/1997 | Mizuta | ...................... | H02P 6/16 318/661 |
| 7,064,509 B1 * | 6/2006 | Fu | ......................... | H02P 7/0094 318/253 |
| 7,265,538 B2 * | 9/2007 | Micke | ...................... | H02P 7/00 324/166 |
| 7,800,321 B2 * | 9/2010 | Knittel | ..................... | G01P 3/48 318/245 |
| 2004/0232872 A1 | 11/2004 | Sunaga et al. | | |
| 2008/0079380 A1 | 4/2008 | Knittel et al. | | |
| 2010/0033064 A1 | 2/2010 | Tanaka et al. | | |

FOREIGN PATENT DOCUMENTS

| JP | 2008-148412 A | 6/2008 |
|---|---|---|
| JP | 2009-085852 A | 4/2009 |
| JP | 2017-070127 A | 4/2017 |

\* cited by examiner

*Primary Examiner* — David Luo
(74) *Attorney, Agent, or Firm* — Posz Law Group, PLC

(57) ABSTRACT

A motor control device is a device for controlling a drive of a DC motor which is interlocked with an output shaft portion of an actuator. The motor control device includes: a relative position obtainer detecting current fluctuations when switching a connection between a commutator and a brush in the DC motor or when rotating the DC motor and obtaining relative position information of the output shaft portion; and an absolute position obtainer obtaining absolute position information of the output shaft portion using a potentiometer. The motor control device further includes: an actual position setter setting actual position information of the output shaft portion based on at least one of the absolute position information and the relative position information.

10 Claims, 10 Drawing Sheets

MOTOR CONTROL DEVICE

CROSS REFERENCE TO RELATED APPLICATION

The present application is based on and claims the benefit of priority of Japanese Patent Application No. 2019-162333, filed on Sep. 5, 2019, the disclosure of which is incorporated herein by reference.

TECHNICAL FIELD

The present disclosure generally relates to a motor control device including an actual position corrector.

BACKGROUND INFORMATION

A method of detecting a rotation state of a DC motor using a rotary encoder, a potentiometer or the like is known.

When a method using a potentiometer is adopted as a method of detecting the rotation state of the DC motor, it is difficult to accurately detect a fine rotation state due to variations in a resistance value of the potentiometer. Also, when the method of detecting the surge current generated when the commutator and the brush are switched is adopted, the surge current becomes smaller as the rotation speed becomes lower, thereby lowering the detection accuracy of the surge current and making it difficult to stably and accurately detect the rotation state. In view of the above, or in other aspects not mentioned, further improvements are required in motor control devices.

SUMMARY

It is an object of the disclosure to provide a motor control device capable of performing high accuracy position control.

In one aspect of the disclosure, a motor control device includes: an actual position setter setting actual position information of the output shaft portion based on at least one of the absolute position information and the relative position information, obtained by respectively different methods.

The disclosed aspects in the specification adopt different technical solutions from each other in order to achieve their respective objects. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

DETAILED DESCRIPTION

Figure 1:
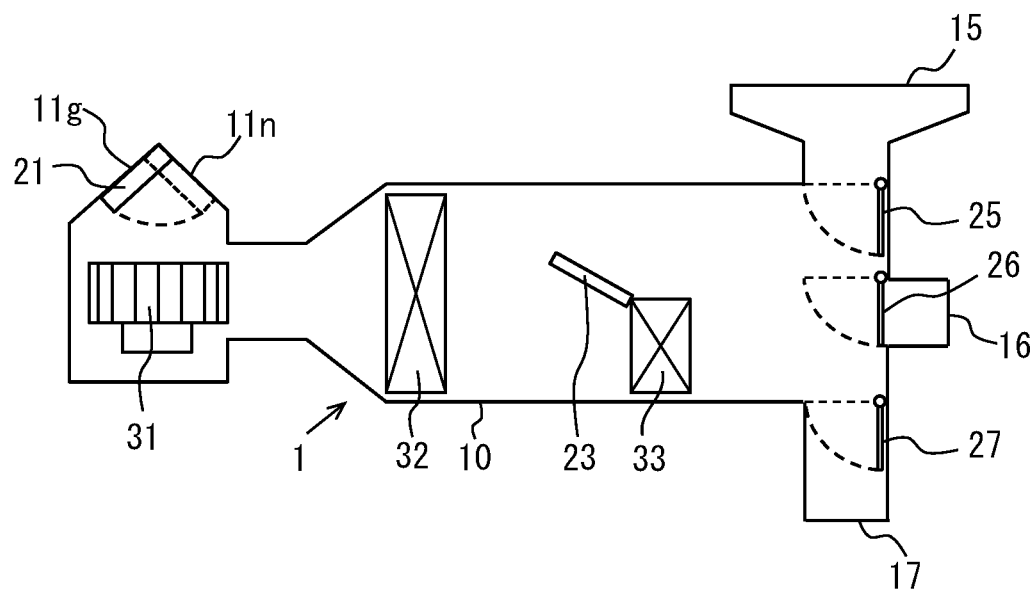
FIG. 1 is a configuration diagram of a vehicle air conditioner.

Embodiments will be described with reference to drawings. In some embodiments, parts that are functionally and/or structurally corresponding to each other and/or associated with each other are given the same reference numerals, or reference numerals with different hundred digit or more digits. For corresponding parts and/or associated parts, additional explanations can be made to the description of other embodiments.

First Embodiment (FIGS. 1-5)

Figure 2:
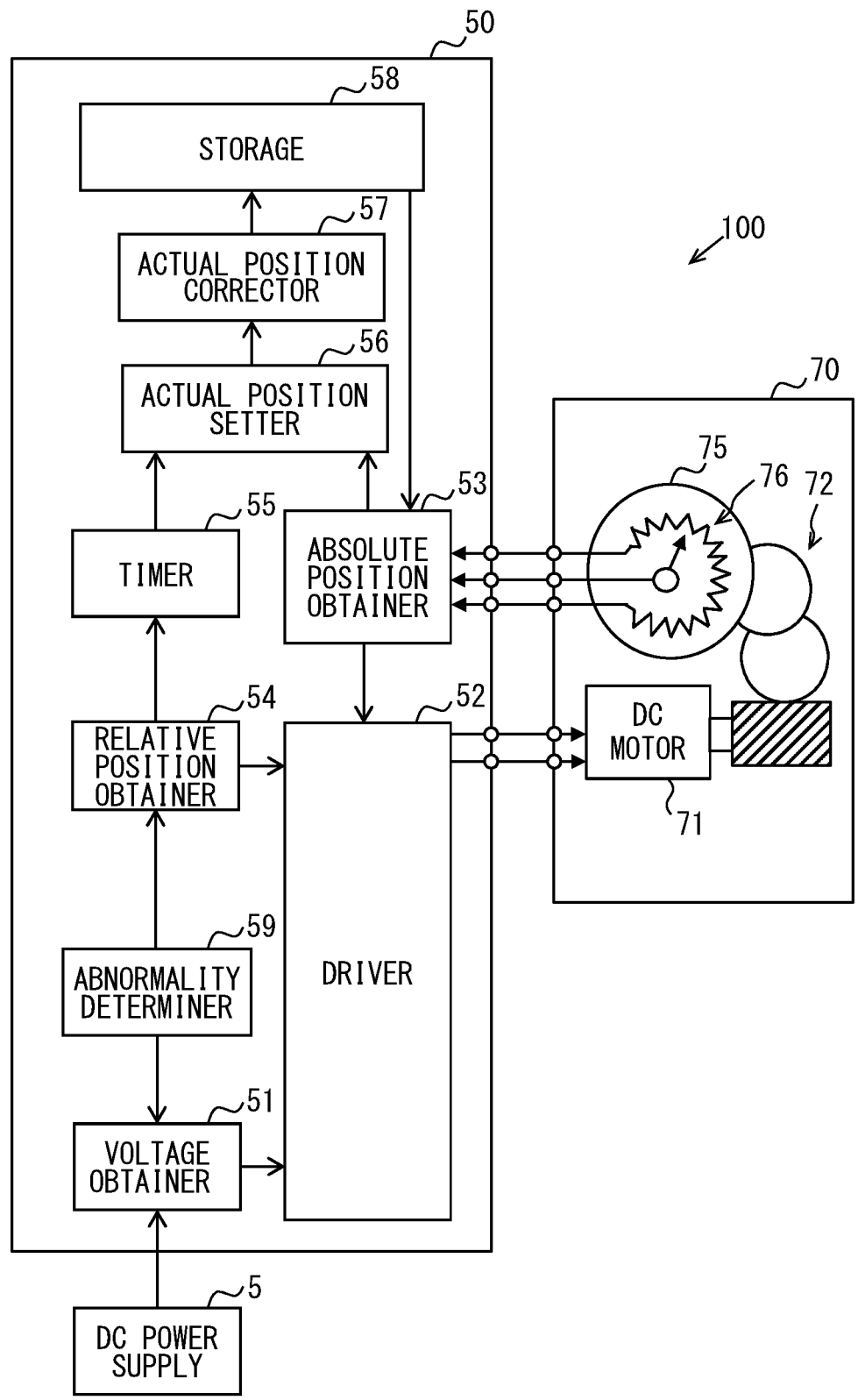
FIG. 2 is a block diagram of a schematic configuration of a motor system.

In FIGS. 1 and 2, a motor control device 50 controls a rotational drive of a motor device. For example, the motor control device 50 controls each motor device provided in a vehicle air conditioner 1. Additionally, the motor control device 50 may control, for example, a motor device for adjusting an opening degree of a valve device such as a three-way valve that switches a flow of liquid such as engine cooling water. Alternatively, a motor device other than the one mounted on a vehicle may also be a control target.

In FIG. 1, the vehicle air conditioner 1 is mounted on a vehicle. The vehicle is, for example, an automobile equipped with a gasoline-powered engine. However, as the vehicle, an electric vehicle equipped with a travel power electric motor or a hybrid vehicle equipped with both an engine and a travel power electric motor can be adopted. The vehicle air conditioner 1 is a device that adjusts temperature of a taken-in air and blows it out into a vehicle interior (or vehicle compartment). In other words, the vehicle air conditioner 1 is a device that performs an air conditioning operation such as a heating operation, a cooling operation, and a dehumidifying operation of the vehicle interior.

The vehicle air conditioner 1 includes an air-conditioning case 10 in which an air path through which air flows is formed. The air-conditioning case 10 houses various devices used for air conditioning. The air-conditioning case 10 is formed with two air intake ports, that is, an inside air intake port 11*n* and an outside air intake port 11*g*. The air-conditioning case 10 is formed with a defroster outlet 15 that blows out conditioned air to a front window of the vehicle. The air-conditioning case 10 has a face outlet 16 that blows out the conditioned air toward an upper part of a front seat. The air-conditioning case 10 has a foot outlet 17 that blows out the conditioned air toward a lower part of the front seat.

The vehicle air conditioner 1 includes a blower 31, an evaporator 32, and a heater core 33. The blower 31 is a device for flowing air into the air-conditioning case 10. The evaporator 32 is a heat exchanger in which a refrigerant flows, and the heat of vaporization when the refrigerant vaporizes from a liquid to a gas is removed from the surrounding air to cool the air. The heater core 33 is a heat exchanger in which high-temperature engine cooling water flows and which uses the heat of the engine cooling water to heat the surrounding air. However, instead of the heater core 33, an electric heater or the like that consumes electric power to heat air may be used, or both the heater core 33 and the electric heater may be used in combination.

The vehicle air conditioner 1 includes an inside/outside air switching door 21 for opening/closing the inside air intake port 11*n* and the outside air intake port 11*g*. The inside/outside air switching door 21 is a door device that adjusts the amount of air introduced into the air-conditioning case 10 through the inside air intake port 11*n* and the outside air intake port 11*g*. The door device is also called a flap device. The door device is also called a damper device.

The inside/outside air switching door 21 realizes an inside air mode in which the inside air intake port 11*n* is opened and the outside air intake port 11*g* is closed to circulate the conditioned air in the vehicle. The inside/outside air switching door 21 realizes an outside air mode in which the conditioned air is taken in from outside the vehicle by closing the inside air intake port 11*n* and opening the outside air intake port 11*g*. However, in the outside air mode, the inside air intake port 11*n* does not have to be completely closed. For example, by slightly opening the inside air intake port 11*n*, the inside air may be taken in at a smaller ratio than the outside air to circulate the air.

The vehicle air conditioner 1 includes an air mix door 23 for adjusting the temperature of the conditioned air. The air mix door 23 is provided downstream of the evaporator 32 and upstream of the heater core 33 in the air flow inside the air-conditioning case 10. By controlling the opening degree of the air mix door 23, the amount of air that passes through the heater core 33 and is heated can be adjusted.

The vehicle air conditioner 1 includes a defroster door 25 for opening and closing the defroster outlet 15. The defroster door 25 is a door device that adjusts the presence/absence and the amount of blowing of the conditioned air from the defroster outlet 15. The vehicle air conditioner 1 includes a face door 26 for opening and closing the face outlet 16. The face door 26 is a door device that adjusts the presence/absence of the conditioned air from the face outlet 16 and the amount of the conditioned air blown out therefrom. The vehicle air conditioner 1 includes a foot door 27 for opening and closing the foot outlet 17. The foot door 27 is a door device that adjusts the presence/absence of the conditioned air from the foot outlet 17 and the amount of the conditioned air blown out therefrom.

The vehicle air conditioner 1 has five outlet modes available for selection: a defroster mode, a face mode, a foot mode, a bi-level (B/L) mode, and a foot defroster (F/D) mode. However, the types of outlet modes are not limited to the above-described five outlet modes. The defroster door 25, the face door 26, and the foot door 27 are door devices that switch according to the selected outlet mode, and are also called mode doors.

The inside/outside air switching door 21 is rotatable in a range from a state in which the inside air intake port 11*n* is (fully) closed to a state in which the outside air intake port 11*g* is (fully) closed. The rotatable angle of the inside/outside air switching door 21 is, for example, 100°. The air mix door 23 is rotatable in a range from a state in which the amount of air passing through the heater core 33 is minimum to a state in which the amount of air not passing through the heater core 33 is minimum. The rotatable angle of the air mix door 23 is, for example, 180°.

The defroster door 25 is rotatable in a range from a state where the defroster outlet 15 is closed to a state where the defroster outlet 15 is completely opened. The rotatable angle of the defroster door 25 is, for example, 90°. The face door 26 is rotatable in a range from a state where the face outlet 16 is closed to a state where the face outlet 16 is completely opened. The rotatable angle of the face door 26 is, for example, 90°. The foot door 27 is rotatable in a range from a state where the foot outlet 17 is closed to a state where the foot outlet 17 is completely opened. The rotatable angle of the foot door 27 is, for example, 90°.

The mode doors including the defroster door 25, the face door 26, and the foot door 27 may be configured in one continuous-body door device. For example, a rotary door that opens and closes each outlet by rotating a door plate portion formed in an arc surface may be adopted. In such case, one door plate portion serves a function as three door devices of the defroster door 25, the face door 26, and the foot door 27. The rotatable angle of the rotary door is, for example, 300°.

The inside/outside air switching door 21, the air mix door 23, the defroster door 25, the face door 26, and the foot door 27 are door devices in which an angle of the door plate portion is adjusted by a servomotor. Since the flow rate of the air around the door plate portion changes depending on an angle of the door plate portion, it is preferable to control an angle of the door plate portion of each door device as accurately as possible.

In FIG. 2, a motor system 100 includes the motor control device 50 and an actuator 70. The actuator 70 includes a DC motor 71, a speed reducer 72, an output shaft portion 75, and a potentiometer 76. The DC motor 71 is a servo motor that is a control target of the motor control device 50. The DC motor 71 is a motor that can easily output a larger torque than a stepping motor.

The DC motor 71 includes a stator having a permanent magnet that functions as a field pole. The DC motor 71 includes a rotor with an air gap on an inner circumference of the field pole. The DC motor 71 includes a commutator coaxially with the rotor. The DC motor 71 is provided with a brush that comes into contact with the commutator and supplies an electric current to the commutator. The DC motor 71 is configured so that the commutator in contact with the brush is constantly switched by the rotation of the DC motor 71.

The output shaft portion 75 is a portion of the actuator 70 that outputs a driving force to the outside of the motor 71. The output shaft portion 75 is connected to a door device such as the inside/outside air switching door 21 of the vehicle air conditioner 1 to drive the door device to rotate. The speed reducer 72 is a part that decelerates the rotation of the DC motor 71 and transmits the rotation to the output shaft portion 75. The speed reducer 72 can adjust a torque and a rotation number required for the actuator 70. The speed reducer 72 includes a plurality of gears including a worm gear.

The potentiometer 76 is a device for measuring a rotational position of the output shaft portion 75. The potentiometer 76 is a variable resistor whose resistance value changes according to the rotational position. A predetermined voltage is applied to the potentiometer 76, and a change in resistance value of the potentiometer 76 can be obtained as a change in voltage. By using the potentiometer 76, it is possible to measure which position the rotational position of the output shaft portion 75 is at present. The potentiometer 76 is a device that detects the rotational position at low cost than a rotational position detection sensor such as an encoder.

The potentiometer 76 is configured to include, for example, a resistance film that is continuously provided along a circumferential direction with respect to a rotation shaft that is coaxial with the output shaft portion 75, and a connection terminal that slides on the resistance film. By applying a voltage to the resistance film of the potentiometer 76, a voltage drop is caused in steps or in the resistance film. As a result, it is possible to detect which position of the resistance film the connection terminal is in contact with based on the voltage level of the potentiometer 76. In other words, the rotational position of the connection terminal can be obtained from the magnitude of the voltage of the potentiometer 76. The resistance film in an ideal potentiometer 76 is formed with a uniform thickness from a start end to the other end. However, in an actual potentiometer 76, the resistance value may deviate significantly from the ideal state due to variations in manufacturing and deterioration over time. In particular, after the number of operations exceeds the guaranteed number, deterioration over time is noticeable, and a change in the resistance value such as an increase in the resistance value of a part of the resistance film is likely to occur.

The motor control device 50 includes a voltage obtainer 51 and a driver 52. The voltage obtainer 51 is a section that obtains a power supply voltage that is an output voltage of a DC power supply 5. The voltage obtainer 51 obtains a voltage in order to monitor whether a power supply voltage has an appropriate value. Here, the DC power supply 5 is, for example, a 12V auxiliary battery. However, when it is not necessary to monitor the power supply voltage, the voltage obtainer 51 may be omitted.

The driver 52 is a section that drives the DC motor 71. The driver 52 controls the timing of applying the power supply voltage of the DC power supply 5 to the DC motor 71, thereby switching between the state in which the DC motor 71 is driven and the state in which the DC motor 71 is not driven. The driver 52 controls the rotational drive of the DC motor 71 based on corrected actual position information to be described later. The driver 52 and the DC motor 71 are connected to each other by a signal line.

The motor control device 50 includes an absolute position obtainer 53. The absolute position obtainer 53 obtains position information using the potentiometer 76. Here, the position information that can be obtained using the potentiometer 76 is absolute position information that indicates at which rotational position the potentiometer 76 that is interlocked/engaged with the output shaft portion 75 is located. However, the potentiometer 76 has a tolerance as a component. Therefore, the actual value (measured value) deviates from the ideal value (true value). For example, variations in the resistance film of the potentiometer 76, which is a variable resistor, cause the characteristic map indicating the relationship between the voltage and the rotational position to deviate from the ideal characteristic map. Therefore, in order to grasp a more accurate position of the output shaft portion 75, it is important to correct the variation of the potentiometer 76. The absolute position obtainer 53 and the potentiometer 76 are connected to each other by a signal line.

The motor control device 50 includes a relative position obtainer 54 and a timer 55. The relative position obtainer 54 detects a change in the electric current supplied to the DC motor 71 via the driver 52 as a relative position signal. More specifically, the surge current generated by switching the contact state between the brush of the DC motor 71 and the commutator is detected as a relative position signal. While the DC motor 71 is rotationally driven, the contact between the brush and the commutator is constantly switched. By detecting the relative position signal generated when switching the commutator, the rotation number of the DC motor 71 from the position where the detection is started can be obtained. Or, the sine wave current generated by the DC motor 71 rotation is detected as a relative position signal. Here, the rotation number of the DC motor 71 is interlocked with the rotational movement amount of the output shaft portion 75. Therefore, when the relative position obtainer 54 detects the relative position signal, the amount of rotation of the output shaft portion 75 can be measured. The position information that is obtained by using the relative position obtainer 54 is relative position information that indicates how much the output shaft portion 75 that is interlocked with the rotation of the DC motor 71 has rotated with reference to a position at which position detection has started.

The timer 55 is a device that measures time when the relative position obtainer 54 detects the relative position signal. By using the timer 55, an elapsed time from the start of position detection by the relative position obtainer 54 can be counted. Thereby, the relative position obtainer 54 associates, with each relative position signal detected using the time information obtained by the timer 55, detection timing/time of the relative position signal. A plurality of timers 55 may be provided. In such case, a dedicated timer 55 for associating a detection timing with the voltage of the potentiometer 76 obtained (i.e., detected) by the absolute position obtainer 53 may be provided. Further, a dedicated timer 55 for associating a detection timing with the voltage of the DC power supply 5 obtained (i.e., detected) by the voltage obtainer 51 may be provided.

The motor control device 50 includes an actual position setter 56 and an actual position corrector 57. The actual position setter 56 sets actual position information, which is information indicating the actual position of the output shaft portion 75, based on the relative position information or the absolute position information. For example, the absolute position information obtained using the potentiometer 76 is regarded as the actual position information of the output shaft portion 75, and the absolute position information is set as the actual position information. However, the relative position information obtained by the relative position obtainer 54 may be set as the actual position information.

The actual position corrector 57 is a section that corrects the actual position information set by the actual position setter 56. The actual position corrector 57 generates correction information from two pieces of position information, i.e., the absolute position information obtained by the absolute position obtainer 53 and the relative position information obtained by the relative position obtainer 54. More specifically, the actual position information is corrected by adding a position difference between the absolute position information and the relative position information to the actual position information. For example, when the absolute position information is set to the actual position information by the actual position setter 56, the difference between the relative position information and the absolute position information that is the actual position information is added to the actual position information, thereby matching the actual position information with the relative position information. However, the method of correcting the actual position information is not limited to the above example.

The motor control device 50 includes a storage 58 and an abnormality determiner 59. The storage 58 is a section that stores information such as corrected actual position information. The storage 58 stores correction information regarding the correction of the actual position information performed in the past.

The abnormality determiner 59 is a section that determines whether or not there is an abnormality in the motor control device 50. The abnormality determiner 59 is connected to the voltage obtainer 51 and determines whether or not there is an abnormality in the DC power supply 5. The abnormality determiner 59 is connected to the relative position obtainer 54 and determines whether there is an abnormality in the relative position signal. The function of the abnormality determiner 59 is not limited to the above example. The abnormality determiner 59 can be connected to a section/part other than the voltage obtainer 51 and the relative position obtainer 54 to determine the presence or absence of various abnormalities in the connected section/part.

A correction mode in which the motor control device 50 corrects the actual position information will be described in the following. Whether to start the correction mode is determined based on the presence or absence of a correction request for correcting the potentiometer 76. For example, when the motor system 100 is driven for the first time, a correction request is made. Further, when a predetermined period has passed since the previous correction, a correction request is made. Here, the predetermined period is, for example, half a year. The switching of the correction request is not limited to the preset case. For example, in an inspection step in a manufacturing process of the vehicle air conditioner 1, an inspection operator may switch to a state in which there is a correction request. Alternatively, the user may switch to a state in which a correction request is made when the vehicle air conditioner 1 is in a mounted state on the automobile.

In the correction mode, the output shaft portion 75 is driven to rotate. Therefore, during the correction mode, the door device is driven differently from a request in the air conditioning control. Therefore, it is preferable that the correction mode is not executed in a state where there is an air conditioning request for the vehicle air conditioner 1, and that the correction mode is executed when there is no air conditioning request for the vehicle air conditioner 1.

Figure 3:
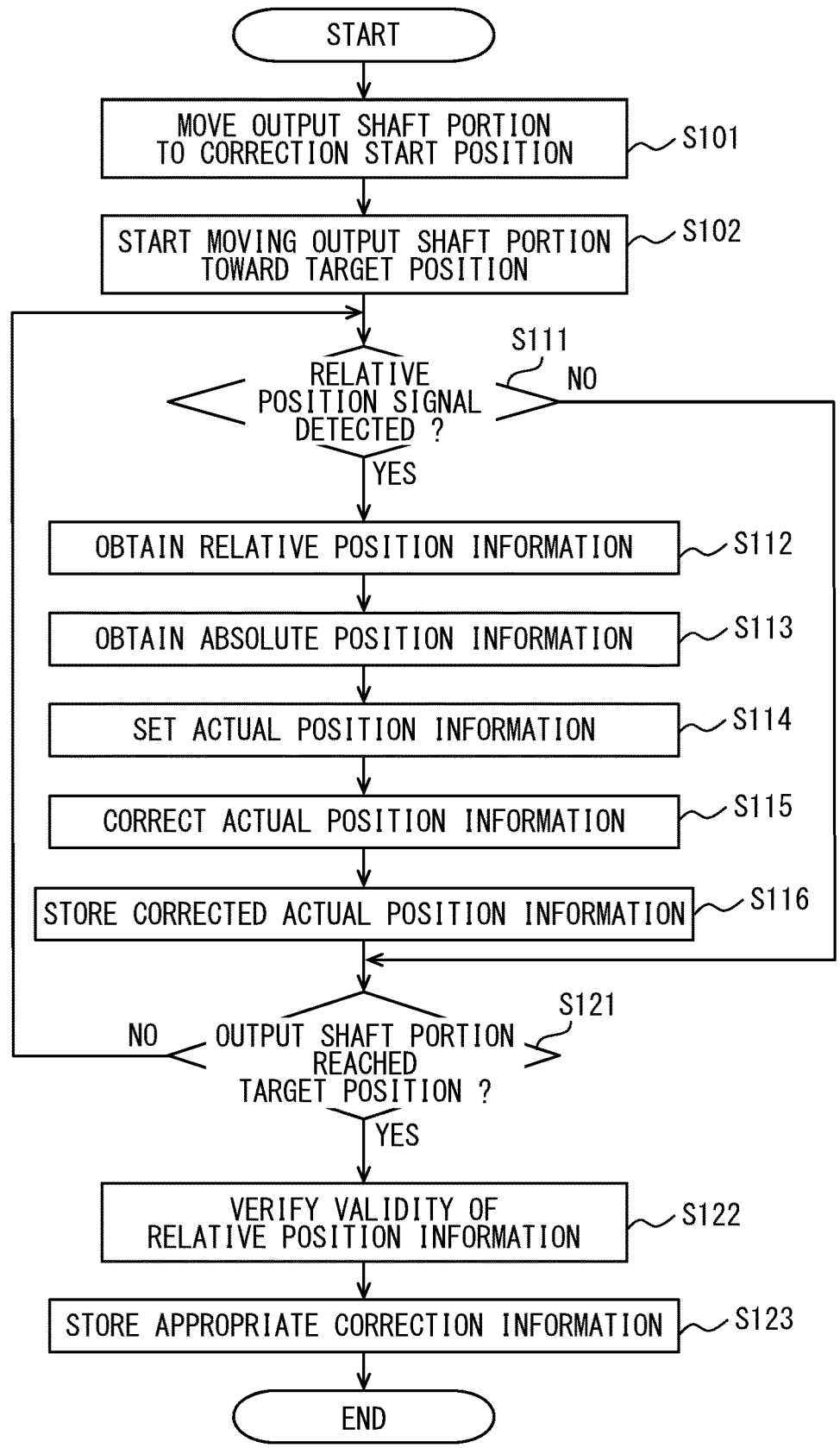
FIG. 3 is a flowchart of control of a motor system in a correction mode.

In FIG. 3, when the correction mode is started, the output shaft portion 75 is moved to a correction start position in step S101. A position where the voltage of the potentiometer 76 is minimized can be set as the correction start position. For example, when the voltage of the potentiometer 76 changes from 0V to 5V, a position indicating 0V is set as the correction start position. The correction start position is not limited to the position where the voltage of the potentiometer 76 is the minimum. For example, as the correction start position, a start position which is a position of one end in the movable range of the output shaft portion 75 may be set. The relative position information obtained as a position of the output shaft portion 75 based on the relative movement of the output shaft portion 75 with this correction start position used as a reference. After moving the output shaft portion 75 to the correction start position, the process proceeds to step S102.

In step S102, the output shaft portion 75 is started to move toward a target position. As the target position, a position where the voltage of the potentiometer 76 is maximum can be set. For example, when the voltage of the potentiometer 76 changes from 0V to 5V, a position indicating 5V is set as the target position. The target position is not limited to a position where the voltage of the potentiometer 76 is maximum. For example, an end position, which is a position of the other end in the movable range of the output shaft portion 75, may be set as the target position. The end position is a position opposite to the start position in the movable range of the output shaft portion 75.

When the motor system 100 is used for the inside/outside air switching door 21, for example, the door position in the inside air mode can be the correction start position, and the door position in the outside air mode can be the target position. When the motor system 100 is used to drive the air mix door 23, for example, a position that covers the flow path that passes through the heater core 33 can be the correction start position, and a position that covers the flow path that does not pass the heater core 33 can be the target position.

When the motor system 100 is used for the defroster door 25, for example, a position where the defroster outlet 15 is fully opened can be the correction start position, and a position where the defroster outlet 15 is fully closed can be the target position. At the position where the defroster outlet 15 is fully opened, the defroster door 25 is brought into contact with the air-conditioning case 10 and abutted against an abutment position, whereby the correction start position can be accurately positioned. By making the defroster door 25 in contact with the air-conditioning case 10 and abutting it at the position where the defroster outlet 15 is fully closed, it is easy to accurately position the target position. However, a large load may be generated on the door device at the time of abutment. Therefore, the door device may be moved at a low speed to the correction start position, to reduce the load at the time of abutment, and the target position may be set to a position determined by not abutting the door device. Alternatively, both of the correction start position and the target position may be set to positions where the defroster door 25 does not abut against the air-conditioning case 10.

Even when the motor system 100 is used for the face door 26, the correction start position and the target position can be set just like the case where the motor system 100 is used for the defroster door 25. Even when the motor system 100 is used for the foot door 27, the correction start position and the target position can be set just like the case where the motor system 100 is used for the defroster door 25.

When moving the output shaft portion 75 from the correction start position to the target position, the rotation speed of the DC motor 71 is kept constant. In other words, the driver 52 drives the DC motor 71 so that the output shaft portion 75 rotates at a constant speed. After starting the movement of the output shaft portion 75 toward the target position, the process proceeds to step S111.

In step S111, it is determined whether the relative position signal is detected. For example, when the surge current generated when switching the commutator and the brush in the DC motor 71 is detected as the relative position signal, the current fluctuation exceeding a threshold value can be detected as the relative position signal. According to such a detection scheme, the current fluctuation due to the noise not exceeding the threshold value and the current fluctuation due to the surge current exceeding the threshold value can be distinguished and detected as the relative position signal.

When the relative position signal is detected, the timer 55 is used to obtain the time when the relative position signal is detected. This makes it possible to know when the relative position signal is obtained. When the relative position signal is detected, the process proceeds to step S112. On the other hand, when the relative position signal is not detected, the process proceeds to step S121.

In step S112, relative position information at a moment of when the relative position signal is detected is obtained. The relative position obtainer 54 obtains the relative position information by calculating the rotational position of the output shaft portion 75 from the reference correction start position based on the detected relative position signal. At this time, the relative position information functions as information indicating at which relative position the output shaft portion 75 is located at a certain timing. After obtaining the relative position information, the process proceeds to step S113.

In step S113, absolute position information at a moment of when the relative position signal is detected is obtained. In other words, the absolute position information at a timing when the relative position information is obtained is obtained. The absolute position obtainer 53 obtains an absolute position from the detected voltage of the potentiometer 76 and the characteristic map stored in the storage 58. The characteristic map is a map showing the relationship between the voltage of the potentiometer 76 and the rotational position of the output shaft portion 75. An initial map, which is a characteristic map of an initial state, is determined by the specifications of the potentiometer 76. However, in the initial map, a predetermined tolerance due to variations in manufacturing of the potentiometer 76 and the like is set, and it is difficult to accurately obtain the rotational position of the output shaft portion 75. After obtaining the absolute position information, the process proceeds to step S114.

In step S114, the actual position information is set. In setting the actual position information, one of the absolute position information and the relative position information is regarded as the actual position information. After setting the actual position information, the process proceeds to step S115.

In an "accurate surge" embodiment, the relative position information (from the surge current) is considered accurate (for use in calibration/correction), and the absolute position information (from the potentiometer) is considered actual (to be measured during normal operations). Alternatively, in an "accurate potentiometer" embodiment, the absolute position (from the potentiometer) information is considered accurate (for use in calibration/correction), and the relative information (from the surge current) is considered actual (to be measured during normal operations).

In step S115, the actual position information is corrected. In the correction of the actual position information, at least one of the absolute position information and the relative position information is used to correct the actual position information. When (in the accurate surge embodiment) the absolute position information is set as the actual position information, the actual position information is corrected using at least the relative position information. On the other hand (in the accurate potentiometer embodiment), when the relative position information is set as the actual position information, the actual position information is corrected using at least the absolute position information.

Accurate Surge Embodiment

Figure 4:
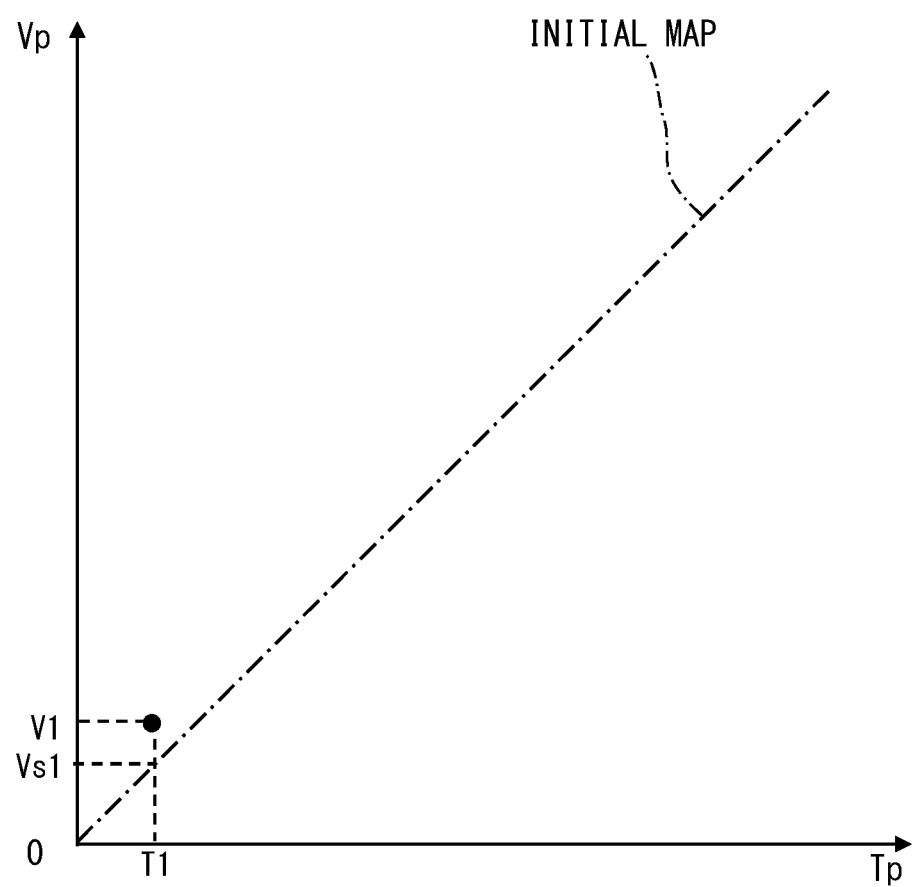
FIG. 4 is a diagram of a characteristic map of a potentiometer during correction.

In the following example, a method of correcting the actual position information is described, in which the actual position information is set as the absolute position information and the actual position information is corrected using the relative position information. FIG. 4 is a diagram of the relationship between a rotational position Tp of the potentiometer 76 and a voltage Vp during the correction. The rotational position of the potentiometer 76 corresponds to the rotational position of the output shaft portion 75. In the drawing, a horizontal axis represents the rotational position and a vertical axis represents the voltage. In the drawing, a dashed-dotted line shows an initial map which is a characteristic map in the initial state in which the variation in the resistance value is not considered. The initial map is a characteristic map of the potentiometer 76 in the ideal state.

A voltage V1 of the potentiometer 76 at the timing when a rotational position reaches T1 is plotted based on the relative position information. Based on the initial map, the voltage when the rotational position is T1 is Vs1 which is lower than V1. The deviation between the plotted point and the initial map corresponds to the correction information. In other words, the difference between V1 and Vs1 corresponds to the correction information at the rotational position T1. After correcting the actual position information, the process proceeds to step S116.

In step S116 of FIG. 3, the corrected actual position information is stored in the storage 58. However, instead of storing the corrected actual position information, the corrected actual position information may be recorded in substance by storing the correction information indicating the deviation from the initial map. After storing the corrected actual position information in the storage 58, the process proceeds to step S121.

In step S121, it is determined whether the output shaft portion 75 has reached the target position. If the output shaft portion 75 has reached the target position, the process proceeds to step S122. On the other hand, if the output shaft portion 75 has not reached the target position, the process returns to step S111. As a result, the detection of the relative position signal and the correction of the actual position information associated therewith are repeated until the output shaft portion 75 reaches the target position from the correction start position.

In step S122, validity of the relative position signal is verified. More specifically, it is determined whether the relative position signal is normal, and it is verified whether the correction of the actual position information is performed based on the normal relative position signal. The abnormality determiner 59 determines whether the relative position signal is normal. If the relative position signal is normal, the corrected actual position information at that timing is determined to be appropriate and reflected in the correction. On the other hand, if the relative position signal is abnormal, the corrected actual position information at that timing is determined to be inappropriate and is not reflected in the correction.

An example of abnormality determination by the abnormality determiner 59 is described in the following. The abnormality determiner 59 determines that there is an abnormality when the timing (i.e., an interval) from obtaining one of the relative position signals to obtaining the next one of the relative position signal is shorter than a predetermined time. For example, if it is assumed that the relative position signals can be obtained at intervals of about 2 ms if normal, the predetermined time is set to 1.5 ms. In such case, when the time required from obtaining one relative position signal to obtaining the next relative position signal is less than the predetermined time of 1.5 ms, it is determined that the obtained relative position signal is an abnormal signal.

Further, even if the timing from obtaining a relative position signal to obtaining the next relative position signal is long, the abnormality determiner 59 determines that the relative position signal itself has no abnormality when an original/legitimate relative position signal is determinable/detectable in between the two relative position signals described above. For example, in case where it is assumed that the relative position signal can be obtained at an interval of about 2 ms if normal, if a relative position signal is obtained at 12.0 ms next to the relative position signal obtained at 8.1 ms, it can be determined that a relative position signal to be originally/legitimately obtained could not be obtained in the vicinity of 10.0 ms. In such case, it is determined that the relative position signal obtained at 12.0 ms indicates a relative position of the two signals ahead from the relative position signal obtained in 8.1 ms obtained last time.

Another example of abnormality determination by the abnormality determiner 59 is described in the following. The abnormality determiner 59 determines that there is an abnormality when the fluctuation amount of the power supply voltage obtained by the voltage obtainer 51 is equal to or greater than a threshold value. For example, if the DC power supply 5 outputs a voltage of 12V stably under normal conditions, the threshold value of the voltage fluctuation amount is set to 2V. In such case, the relative position signal obtained at the timing when the voltage fluctuation of the DC power supply 5 exceeds 2V is determined to be an abnormal signal. After selecting the corrected actual position information, the process proceeds to step S123.

In step S123, appropriate correction information is stored. In other words, with respect to the appropriate correction information determined to be normal by the abnormality determiner 59, the correction information is integrated one by one and stored as one correction information. More specifically, the corrected map, which is the corrected characteristic map, is stored in the storage 58. When it is determined in step S122 that the relative position signal is abnormal, the corresponding relative position signal is not used for correction. Further, since the magnitude of the generate surge current varies, if the generated surge current is small, the surge current may not be detected as a relative position signal. Therefore, some plot points may be missing in the corrected map. Even if the plot points of the corrected map are missing only partially, the corrected map can be created based on the normal plot points. However, when the number of (normal) plot points is small, such as when there are many relative position signals that are determined to be abnormal, a corrected map with low accuracy may be created. In such case, the correction mode may be restarted from the beginning without creating the corrected map.

Figure 5:
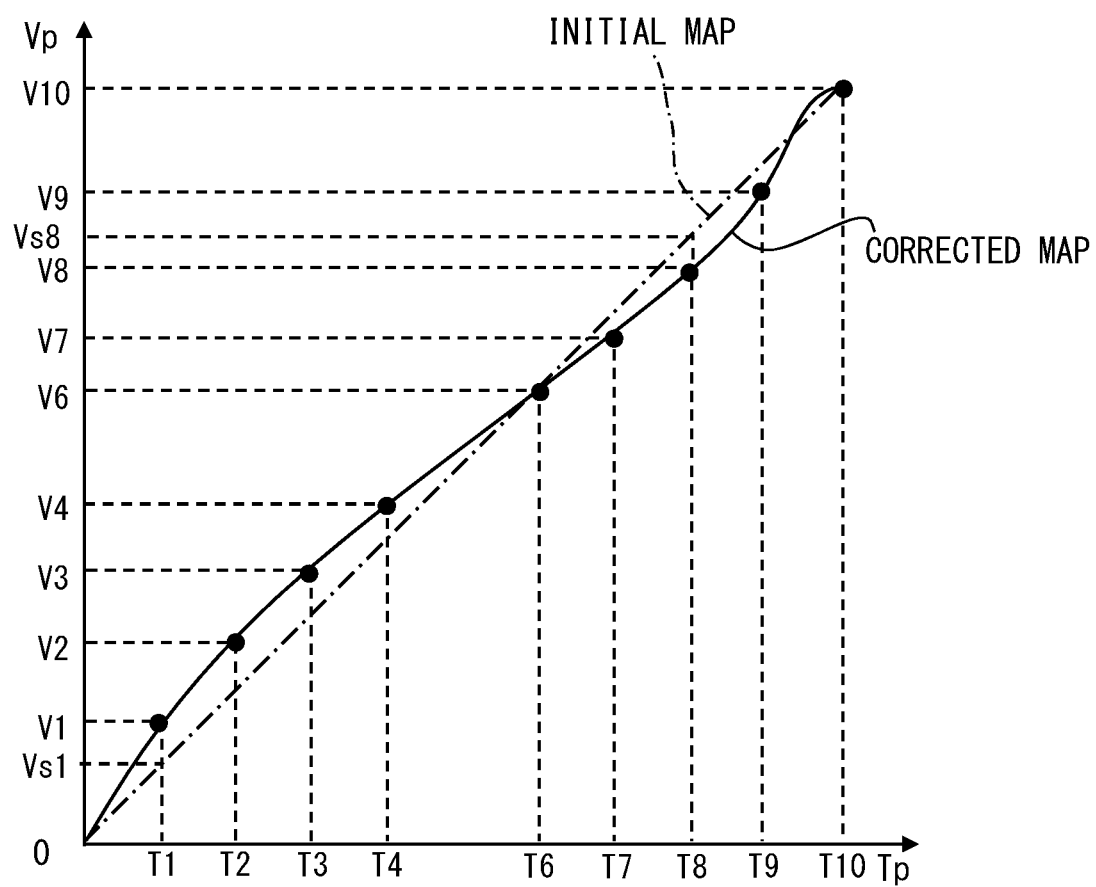
FIG. 5 is a diagram of a characteristic map of the potentiometer after correction.

FIG. 5 is a diagram of the relationship between the rotational position Tp and the voltage Vp in the potentiometer 76 after the correction is complete. In the drawing, an example of a corrected map which is a corrected characteristic map in consideration of variations in resistance value and the like is shown by a solid line. The corrected map is a map showing the characteristics of the actual potentiometer 76.

The correction start position to the target position is divided into 10 steps of T1 to T10. Based on the relative position information, the voltage of the potentiometer 76 is plotted for each of the positions T1 to T10, i.e., as a voltage when the rotational position of the potentiometer 76 reaches each of those positions. However, in this example, the rotational position corresponding to T5 is not plotted, because it is determined that a normal relative position signal could not be obtained at or around T5. The solid line of the corrected map smoothly connects each of the plot points and zero point, at which the rotational position and the voltage of the potentiometer 76 are both zero. However, as a method of drawing the line of the corrected map, any appropriate method can be adopted from various approximation methods.

In the initial map, the straight line has a constant inclination. On the other hand, in the corrected map, the inclination is slightly different depending on the rotational position. Further, at T1, the voltage V1 in the corrected map is higher than the voltage Vs1 in the initial map. In other words, if the rotation of the DC motor 71 is controlled to T1 based on the initial map, it will be controlled to a rotational position smaller than T1. On the other hand, at T8, the voltage V8 in the corrected map is smaller than the voltage Vs8 in the initial map. In other words, if the rotation of the DC motor 71 is controlled to T8 based on the initial map, the rotational position is controlled to be larger than T8.

The initial map shows the actual position information before correction. In other words, the initial map shows the absolute position information. The corrected map shows the corrected actual position information. The difference between the initial map and the corrected map indicates the correction information. Obtaining the absolute value information and setting the actual position information using the corrected map instead of the initial map is equivalent to obtaining the absolute position information and correcting it by using the relative position information.

In the above example, the rotational position is divided into 10 positions/steps from T1 to T10, and the voltages of the potentiometer 76 at the corresponding positions are plotted, for explanation purposes. However, the number of divisions is not limited to 10. For example, every time the relative position signal is detected, the relationship between the rotational position and the voltage of the potentiometer 76 may be plotted, for having the number of plot points exceeding 1000. When the relative position signal is a surge current, the time from the detection of the relative position signal to the next detection of the relative position signal depends on the speed at which the DC motor 71 is rotated and is, for example, 2 ms. When the signal detection interval is 2 ms and it takes 5 s to move from the correction start position to the target position, the number of plot points is 2500.

Correction accuracy can be improvable when a larger number of points are plotted by obtaining the voltage of the potentiometer 76 at fine/small steps of rotational positions. On the other hand, when the number of plot points is small, time to create the map is shortened. For example, it may be configured that the relative position signal is detected every time the surge current is detected twice, and the voltage of the potentiometer 76 is plotted with respect to such rotational position. According to such configuration, the number of plot points can be halved as compared with the case of plotting each time the relative position signal is detected. Therefore, it is easy to shorten the time required for correction. The number of plot points is preferably set as appropriate according to the required accuracy of correction and the required time.

The process from detecting the relative position signal in step S111 to storing the corrected actual position information in step S116 is performed using a microcomputer of the motor control device 50. Therefore, it is preferable that the processing performance of the microcomputer is high. More specifically, a microcomputer capable of setting a scan channel and converting plural channels is preferable. Further, when storing information in the storage 58, it is preferable to use a microcomputer capable of high-speed storage by DMA (Direct Memory Access). Also, a highly robust microcomputer capable of external interrupt AD conversion and having a noise filter function in the external interrupt itself is preferable. In particular, when the output shaft portion 75 is moved from the correction start position to the target position in a few seconds and the number of plot points is several thousand, it is necessary to process a huge amount of information in a short time. Therefore, it is important that the performance of the microcomputer is high and that the processing can be executed with an extremely small time lag in order to accurately correct the actual position information.

The storage 58 simultaneously stores two characteristic maps, an initial map and a corrected map. Here, the abnormality determiner 59 may determine whether or not the corrected map is contained within an allowable/acceptable tolerance range of the initial map. If the corrected map as a whole is contained within the allowable tolerance range of the initial map, it is determined that the corrected map and the potentiometer 76 have no abnormality. On the other hand, if even a part of the corrected map is not within the allowable tolerance range of the initial map, it is determined that at least one of the corrected map and the potentiometer 76 is abnormal. If it is determined that there is an abnormality, there is a possibility that the potentiometer 76 is normal but the correction mode is abnormal, and an incorrect corrected map is obtained. In such case, an appropriate corrected map may be obtained by performing the correction mode again. If the corrected map is not within the allowable tolerance range of the initial map, it is preferable to notify/prompt the user either to re-execute the correction mode or to replace the potentiometer 76.

When the corrected map obtained in the correction mode performed in the past is already stored in the storage 58, both of the past corrected map and the latest corrected map may be stored/retained. According to such method, it is possible to estimate the degree of aging deterioration (i.e., progress of aging) of the potentiometer 76 by comparing the past corrected map and the latest corrected map. After the corrected map is stored in the storage 58 as appropriate correction information, the correction mode is ended.

When the corrected map is stored in the storage 58, the absolute position obtainer 53 can obtain the absolute position information of the output shaft portion 75 based on the corrected map when driving the motor system 100. Here, the absolute position information obtained using the corrected map is position information that takes into consideration variations in the potentiometer 76, which may make it easier to accurately obtain the actual rotational position of the output shaft portion 75 than obtaining it from the absolute position information obtained based on the initial map. Therefore, without repeating/newly performing a control using the relative position information such as obtaining the relative position information by the relative position obtainer 54, the rotational position of the output shaft portion 75 can be accurately obtained.

According to the above-described embodiment, the actual position setter 56 sets the actual position information of the output shaft portion 75 based on at least one position information among the two, i.e., among the absolute position information and the relative position information. Further, the actual position corrector 57 corrects the actual position information based on at least one position information among the two, i.e., among the absolute position information and the relative position information. Therefore, the rotational position of the output shaft portion 75 can be obtained using the two pieces of position information, i.e., the absolute position information and the relative position information. Therefore, as compared with the case where the rotational position of the output shaft portion 75 is obtained using only one of the absolute position information and the relative position information, the rotational position of the output shaft portion 75 can be obtained with higher accuracy. Therefore, it is possible to provide the motor control device 50 capable of highly accurately controlling the position.

The actual position setter 56 sets the actual position information using the absolute position information, and the actual position corrector 57 corrects the actual position information using the relative position information. Here, the absolute position information is affected by manufacturing variations of the potentiometer 76, deterioration over time (i.e., aging), and the like. Therefore, it is difficult to accurately obtain the rotational position of the output shaft portion 75. However, the absolute position information can be easily obtained from the voltage of the potentiometer 76. On the other hand, as for the relative position information, the rotational position of the output shaft portion 75 can be easily obtained from the rotation number of the DC motor 71 with high accuracy. However, it is necessary to start the detection of the relative position signal after aligning/calibrating the relative position information with the reference position. Therefore, by correcting the easily obtained absolute position information based on the highly accurate relative position information, the rotational position of the output shaft portion 75 can be accurately obtained.

The actual position corrector 57 corrects the actual position information by adding the difference between the absolute position information and the relative position information to the actual position information. In such manner, the actual position information can be corrected to match the relative position information. Therefore, it is easy to accurately obtain the rotational position of the output shaft portion 75 by correcting the actual position information so as to match the relative position information with which the rotational position of the output shaft portion 75 is easily obtained.

The storage 58 stores a corrected map showing the relationship between the voltage of the potentiometer 76 and the corrected actual position information. Therefore, when the DC motor 71 is driven in a mode other than the correction mode, the DC motor 71 can be controlled using the corrected map stored in the storage 58. Therefore, the rotational position of the output shaft portion 75 can be more accurately obtained as compared with the case where the initial map having a large allowable tolerance is used due to the influence of manufacturing variation of the potentiometer 76. Further, by driving the DC motor 71 using the corrected map, it is possible to obtain the corrected position information without obtaining the relative position signal and the relative position information.

The storage 58 stores the initial map and the corrected map. Therefore, the initial map and the corrected map can be compared. Thereby, for example, when the corrected map is out of the allowable tolerance range of the initial map, it can be determined that the potentiometer 76 may be out of order. Alternatively, when the corrected map is out of the allowable tolerance range of the initial map, it can be determined that the correction mode may not be properly executed and an incorrect corrected map may be obtained.

When it is determined that the relative position signal has an abnormality, the actual position corrector 57 does not reflect the corrected actual position information in the correction. In other words, when the abnormality determiner 59 determines that there is an abnormality, the actual position corrector 57 does not correct the actual position information using the absolute position information or the relative position information at the timing when the abnormality occurs. Therefore, it is possible to prevent erroneous correction of the actual position information using the abnormal value. Therefore, it is easy to keep the correction accuracy high.

When the abnormality determiner 59 determines that there is an abnormality, the actual position corrector 57 does not correct the actual position information using the absolute position information or the relative position information at the timing of when the abnormality occurs, which is obtained by using the timer 55. Therefore, the time when the absolute position information and the relative position information are obtained and the time when the abnormality occurs can be inquired later. In other words, it is not necessary to determine whether or not there is an abnormality at the same time of obtaining the absolute position information and the relative position information. Therefore, as compared with the case where the validity of the detected relative position signal is verified at the same time of detecting the relative position signal, the processing performed by the motor control device 50 is easily dispersed/spread over time.

When the fluctuation amount of the voltage obtained by the voltage obtainer 51 is equal to or greater than the threshold value, the abnormality determiner 59 determines that the relative position information at such timing is abnormal. Therefore, even if the relative position obtainer 54 erroneously detects the current fluctuation due to the voltage fluctuation of the DC power supply 5 as the current fluctuation when the connection between the commutator and the brush is switched, the erroneously detected signal is not used for correction. Therefore, it is possible to prevent erroneous correction of the actual position information using the abnormal value.

The output shaft portion 75 has one end of a movable range set as an abutment position where the output shaft portion 75 is mechanically abutted. Further, the actual position corrector 57 corrects the actual position information by correcting the absolute position information at the abutment position using the relative position information at the abutment position, for example. Here, the abutment position is a position that can correspond to a state in which the door device is fully closed, and is a position that is mechanically determined. Therefore, it is easy to obtain accurate position information from such position. Therefore, position information that may include an error such as relative position information can be associated with the abutment position of the output shaft portion 75. In particular, by setting the abutment position as the correction start position, the correction can be performed with reference to the accurate position of the output shaft portion 75. Therefore, it is easy to improve the correction accuracy of the actual position information.

The relative position obtainer 54 obtains the relative position information of the output shaft portion 75 at a plurality of positions including at least a position where the door device is abutted against the air-conditioning case 10. Therefore, the abutment position can be included in the relative position information. Therefore, the accurate position information of the output shaft portion 75 and the relative position information can be associated with each other. In particular, by setting the abutment position as the correction start position, the relative position information can be obtained based on the accurate position of the output shaft portion 75. Therefore, it is easy to improve the correction accuracy of the actual position information.

In the control of the correction mode, in step S113, it is not necessary to obtain the absolute position information only at the moment when the relative position signal is detected. For example, the absolute position information may always be obtained. In such case, the timer 55 is used to associate a timing and the voltage, i.e., the voltage of the potentiometer 76 is recorded with time (e.g., with time stamp). Thereby, the absolute position information at the moment when the relative position signal is detected can later be inquired and the actual position information can later be collectively corrected. In other words, the process from step S114 to step S116 can be collectively executed after the output shaft portion 75 reaches the target position in step S121.

In the control of the correction mode, step S122 may be omitted. In such case, all of the corrected actual position information are treated as appropriate correction information and stored in the storage 58 as a corrected map.

Figure 6:
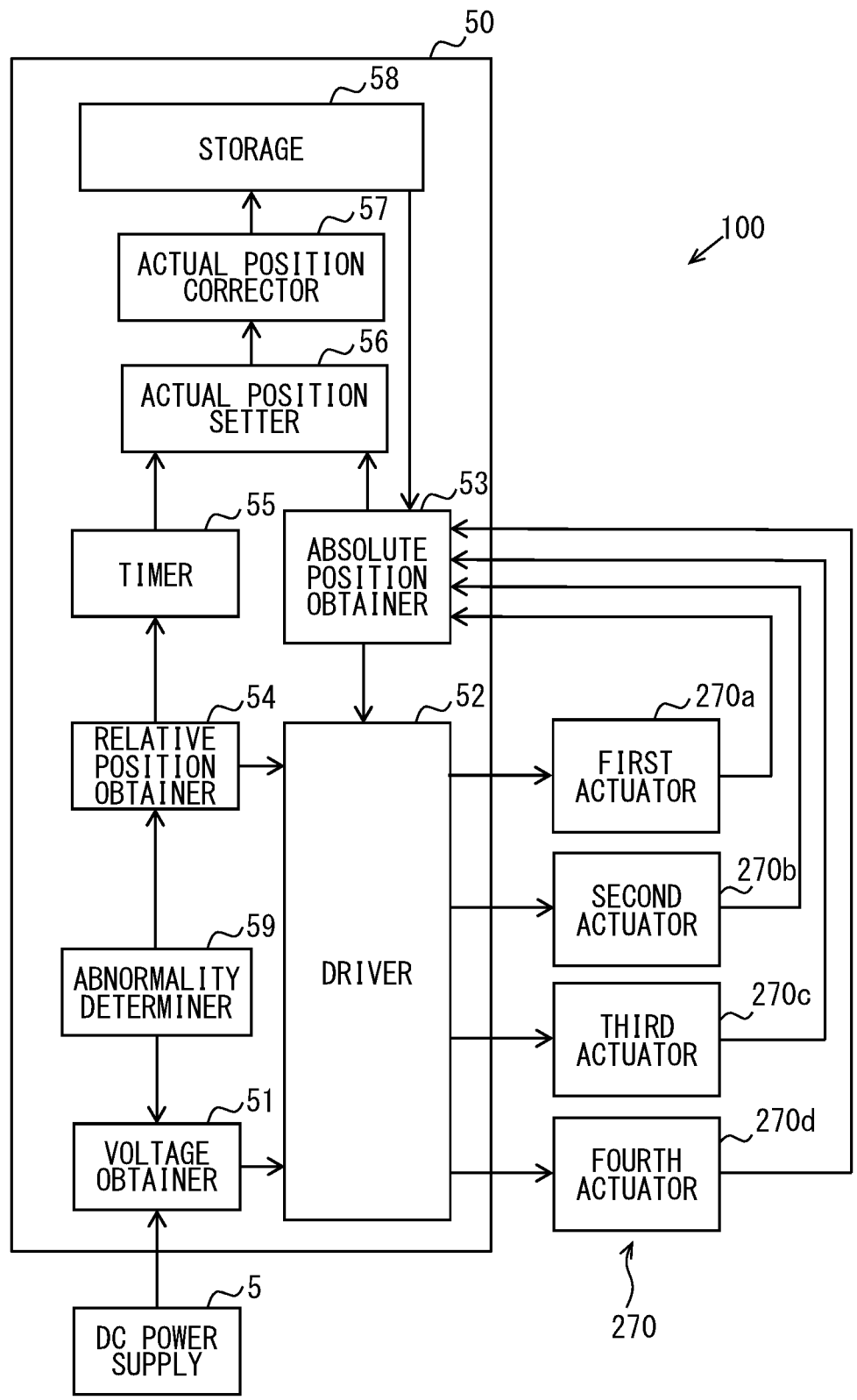
FIG. 6 is a block diagram of a schematic configuration of the motor system according to a second embodiment.

Second Embodiment (FIG. 6)

The second embodiment is a modification on top of a preceding embodiment serving a base thereof. In the present embodiment, the driver 52 drives an actuator 270 having a plurality of actuator devices.

In FIG. 6, the actuator 270 includes a first actuator 270a, a second actuator 270b, a third actuator 270c, and a fourth actuator 270d. The actuator devices that constitute the actuator 270 drive respectively different door devices. For example, the first actuator 270a drives the inside/outside air switching door 21. For example, the second actuator 270b drives the air mix door 23. For example, the third actuator 270c drives the defroster door 25. For example, the fourth actuator 270d drives the face door 26.

The number of actuator devices constituting the actuator 270 is not limited to four. The actuator 270 may include less than four actuator devices. Alternatively, the actuator 270 may include more than four actuator devices.

The driver 52 is a 4-channel driver capable of driving the actuator 270 having four actuator devices. Each actuator device that constitutes the actuator 270 and the driver 52 are connected by a signal line. Each actuator device that constitutes the actuator 270 and the absolute position obtainer 53 are connected by a signal line. However, if there is no problem in signal processing or the like, the motor control device 50 and the actuator 270 may be connected by wireless communication to exchange signals.

When the correction mode is performed, only one actuator device to be corrected is driven, and driving of the remaining actuator devices not to be corrected is stopped. For example, when the first actuator 270a is the correction target, the driving of the second actuator 270b, the third actuator 270c, and the fourth actuator 270d is stopped. In such state, the correction mode is controlled while moving the first actuator 270a from the correction start position to the target position. In such manner, a situation such as electric current fluctuation overlapping with each other among different actuator devices is preventable, for a correct detection of the relative position signal.

A first corrected map, which is a map obtained in the correction mode targeting the first actuator 270a, is a corrected/post-correction map dedicated to the first actuator 270a. Therefore, it is not used for driving actuator devices other than the first actuator 270a.

After ending the correction mode of the first actuator 270a, the correction mode for the second actuator 270b is performed. At this time, the driving of the first actuator 270a, the third actuator 270c, and the fourth actuator 270d is stopped. In such state, the correction mode is controlled while moving the second actuator 270b from the correction start position to the target position. In such manner, a second corrected map, which is a map dedicated to the second actuator 270b, is obtained.

Similarly, a third corrected map, which is the corrected map dedicated to the third actuator 270c, is obtained. Further, a fourth corrected map, which is the corrected map dedicated to the fourth actuator 270d, is obtained. Accordingly, a dedicated corrected map can be obtained for each actuator device that constitutes the actuator 270. When the actuator 270 is driven in a mode other than the correction mode, each actuator device can be driven while obtaining absolute position information using a dedicated corrected map. In such manner, the motor control device 50 can obtain the absolute position information with (i.e., in consideration of) the correction with ease, and control each DC motor 71 for each actuator device.

The correction mode does not have to be performed for all the actuator devices constituting the actuator 270. For example, the correction mode may be performed only for the actuator device for driving the door device that requires particularly fine rotational position control.

According to the above-described embodiment, the driver 52 stops driving the remaining actuator devices while driving one actuator device that is the correction target. In other words, the driver 52 stops driving the remaining DC motors 71 while the relative position obtainer 54 obtains the relative position information of one DC motor 71. Therefore, it is possible to prevent a plurality of actuator devices from being driven simultaneously. Therefore, it is possible to prevent/suppress a situation in which the surge currents are overlapping to hinder correctly obtaining the relative position signal. Therefore, it is easy to stably improve the accuracy of correction in the correction mode. Further, it is possible to disperse/distribute the load applied to the microcomputer/controller as compared with a case where the correction is simultaneously performed for all the actuator devices.

The driver 52 can drive the first actuator 270a, the second actuator 270b, the third actuator 270c, and the fourth actuator 270d. That is, one driver 52 can drive a plurality of actuator devices. Therefore, the motor system 100 can be easily miniaturized (i.e., can have reduced body size) as compared with a configuration in which a separate driver 52 is provided for each of a plurality of actuator devices. Further, as for the relative position obtainer 54 that detects the current fluctuation in the driver 52, it is not necessary to provide another relative position obtainer 54 for each of the plurality (i.e., for the rest) of actuator devices. Therefore, the motor system 100 can be easily configured in a small size and at low cost.

Figure 7:
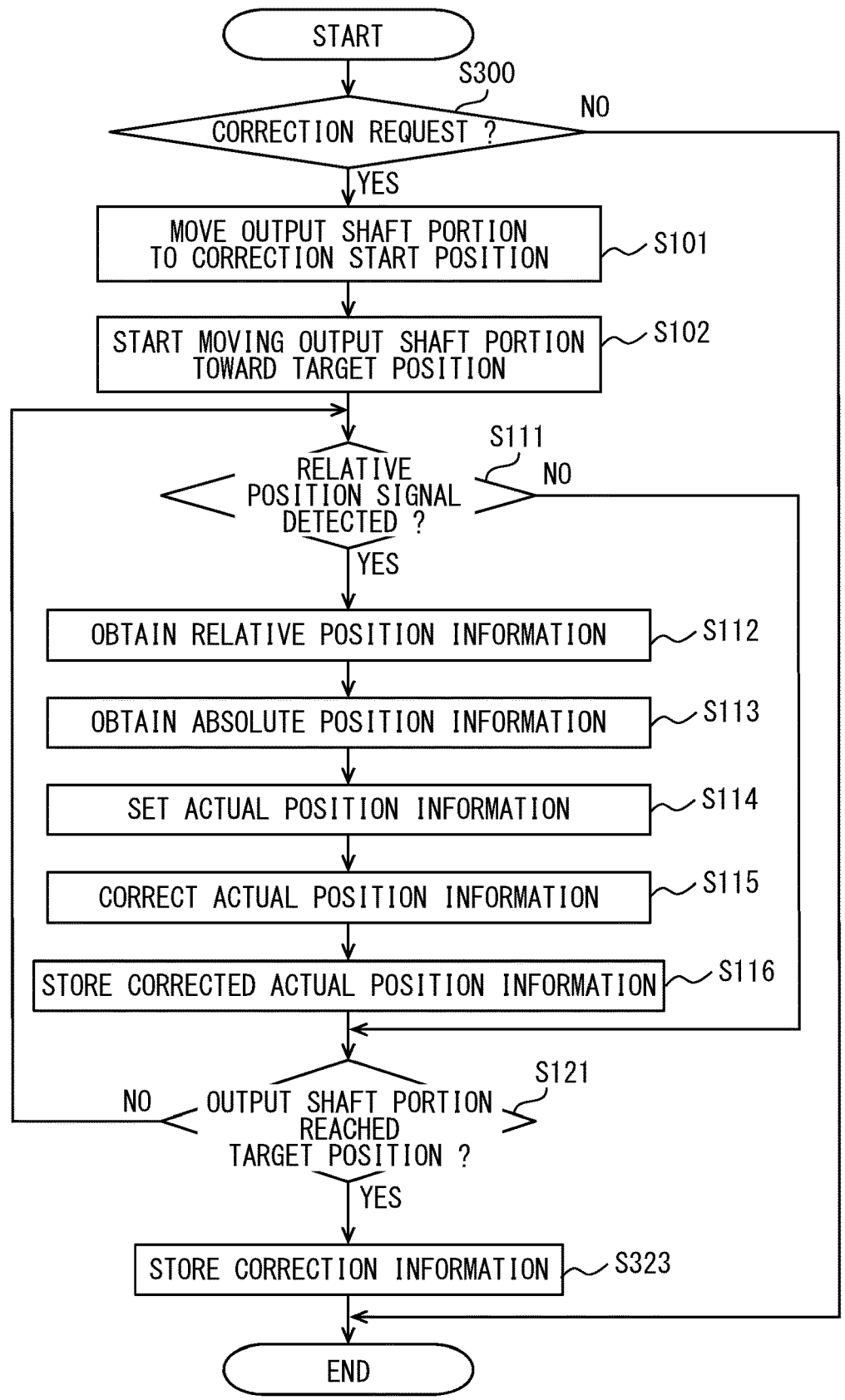
FIG. 7 is a flowchart of correction control of the motor system according to a third embodiment.

Third Embodiment (FIG. 7)

The third Embodiment is a modification on top of preceding embodiments serving a base thereof. In the present embodiment, the presence or absence of a correction request is determined. Further, the correction information is stored without verifying the validity of the relative position signal.

In FIG. 7, when the control relating to the correction of the DC motor 71 is started, it is determined in step S300 whether there is a correction request. If there is a correction request, the process proceeds to step S101 to perform the above-described series of control related to correction. On the other hand, if there is no correction request, the control relating to the correction of the DC motor 71 is ended.

For example, when the motor system 100 is driven for the first time, a correction request is made. Further, when a predetermined period has passed since the previous correction, a correction request is made. Here, the predetermined period is, for example, half a year. The switching of the correction request is not limited to the preset case. For example, in an inspection step in a manufacturing process of the vehicle air conditioner 1, an inspection operator may switch to a state in which there is a correction request. Alternatively, the user may switch to a state in which a correction request is made when the vehicle air conditioner 1 is in a mounted state on the automobile.

When it is determined in step S121 that the output shaft portion 75 has reached the target position, the process proceeds to step S323. In step S323, the correction information is stored. At this time, the correction information is stored without verifying the validity of the relative position signal. In other words, all of the detected relative position signals are regarded as appropriate signals and the correction information is stored.

According to the above-described embodiment, it is determined whether or not there is a correction request. Therefore, the time until the DC motor 71 shifts to the normal drive can be shortened as compared with a case where the control relating to the correction is always performed regardless of the correction request.

The correction information is stored without verifying the validity of the relative position signal. Therefore, the correction can be complete more quickly than in the case where the validity of the relative position signal is verified and the correction is performed.

Figure 8:
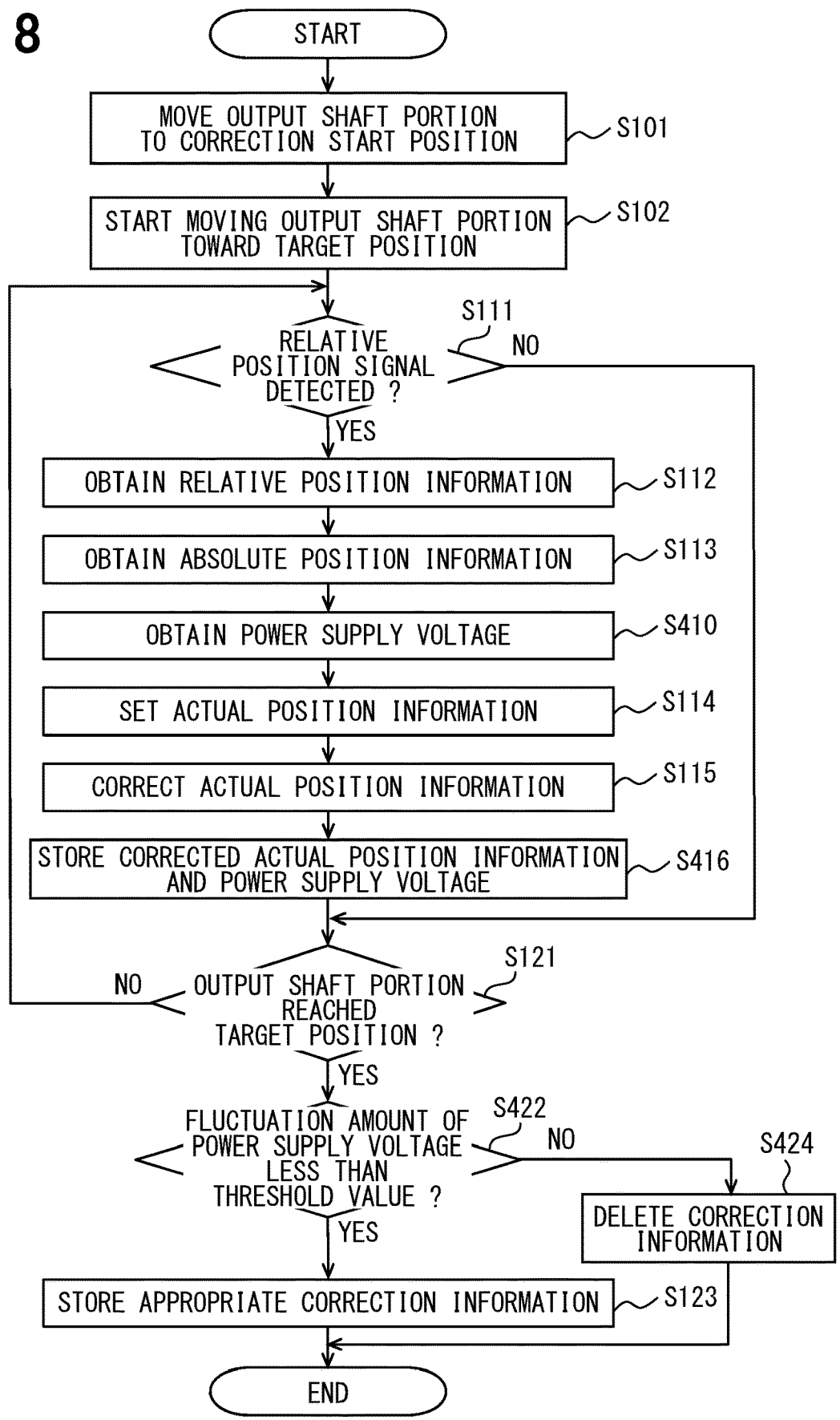
FIG. 8 is a flowchart of correction control of the motor system according to a fourth embodiment.

Fourth Embodiment (FIG. 8)

The fourth Embodiment is a modification on top of preceding embodiments serving a base thereof. In the present embodiment, it is determined whether or not the fluctuation amount of the power supply voltage is less than the threshold value, and such determination is reflected to the correction.

In FIG. 8, when the relative position signal is detected in step S111, the relative position information is obtained in step S112, the absolute position information is obtained in step S113, and the power supply voltage is obtained in step S410. In other words, the power supply voltage at the timing when the relative position signal is detected in step S111 is obtained. After obtaining the power supply voltage, the actual position information is set in step S114, and the actual position information is corrected in step S115. After correcting the actual position information in step S115, the process proceeds to step S416.

In step S416, the corrected actual position information and the power supply voltage are stored. At this time, the corrected actual position information and the power supply voltage (detected) at the same timing are stored. After storing the corrected actual position information and the power supply voltage, the process proceeds to step S121, and it is determined whether the output shaft portion 75 has reached the target position. If the output shaft portion 75 has reached the target position, the process proceeds to step S422. On the other hand, when the output shaft portion 75 has not reached the target position, the process returns to step S111.

In step S422, it is determined whether the fluctuation amount of the power supply voltage is less than a threshold value. Here, the power supply voltage used for the determination is the power supply voltage at the timing when the relative position signal is detected. Since the power supply voltage is obtained and stored each/every time the relative position signal is detected, threshold determination involves a plurality of power supply voltages. If the fluctuation amount of the power supply voltage is less than the threshold value, it is determined that the DC power supply 5 is operating normally at the timing when the relative position signal is obtained, and the process proceeds to step S123. On the other hand, when the fluctuation amount of the power supply voltage is equal to or greater than the threshold value, it is determined that the DC power supply 5 is abnormal at the timing when the relative position signal is obtained, and the process proceeds to step S424.

In step S123, correction information is stored as appropriate based on an assumption that all the detected relative position signals are regarded as appropriate signals. After storing the appropriate correction information, the control regarding the correction is ended.

In step S424, it is considered that the detected relative position signals include an inappropriate signal, and the correction information is deleted. However, the correction information to be deleted is the correction information obtained in the current correction mode, and the correction information stored in the correction mode(s) in the past is maintained (i.e., is kept intact) in the stored state. After deleting the correction information, the control relating to the correction is ended. However, instead of ending the control related to the correction, the process may return to step S101 and the correction mode may be performed from the beginning.

According to the above-described embodiment, the power supply voltage is obtained every time the relative position signal is detected, and then it is determined whether or not the fluctuation amount of the power supply voltage is less than the threshold value. Therefore, it is possible to determine, from the fluctuation of the power supply voltage, whether the relative position signal is an appropriate signal or an inappropriate signal due to the influence of the fluctuation of the power supply voltage. Therefore, it is possible to prevent/suppress erroneous correction based on an inappropriate signal.

Figure 9:
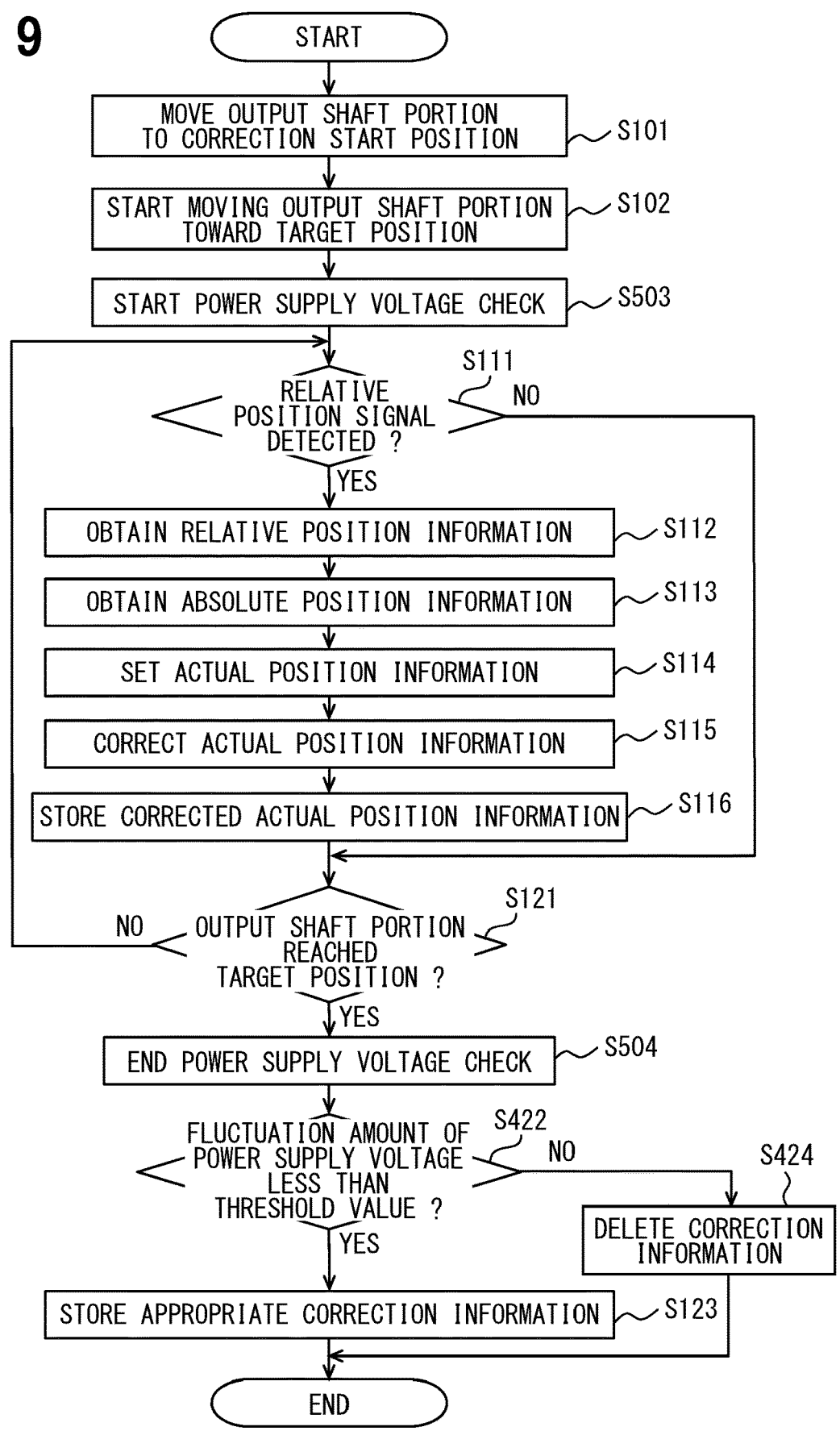
FIG. 9 is a flowchart of correction control of the motor system according to a fifth embodiment.

Fifth Embodiment (FIG. 9)

The fifth Embodiment is a modification on top of preceding embodiments serving a base thereof. In the present embodiment, the power supply voltage is checked while the output shaft portion 75 is being moved from the correction start position to the target position.

In FIG. 9, after the output shaft portion 75 is moved to the correction start position in step S101, the output shaft portion 75 is started to move toward the target position in step S102. Then, the process proceeds to step S503.

In step S503, checking of the power supply voltage is started. In the power supply voltage check, the power supply voltage is obtained and stored at every predetermined time/interval. In such manner, it is possible to store at what timing and how the power supply voltage has changed. It is preferable that the interval of the predetermined time for obtaining the power supply voltage is approximately the same as the interval for detecting the relative position signal. For example, when it is assumed that the relative position signal is detected at an interval of 2 ms, the interval for obtaining the power supply voltage is also set to 2 ms. However, the interval for obtaining the power supply voltage may be set to an interval shorter than the detection interval of the relative position signal. Alternatively, the power supply voltage detection interval may be set to an interval longer than the detection interval of the relative position signal. After starting the power supply voltage check, the process proceeds to step S111 while continuing the power supply voltage check.

When it is determined in step S121 that the output shaft portion 75 has reached the target position, the process proceeds to step S504. In step S504, the power supply voltage check is ended. In such manner, the power supply voltage is obtained every predetermined time until the output shaft portion 75 reaches the target position from the correction start position. After ending the power supply voltage check, the process proceeds to step S422. If the fluctuation amount of the power supply voltage is less than the threshold value in step S422, it is determined that the DC power supply 5 has been normally operating by the time when the output shaft portion 75 reaches the target position from the correction start position, and the process proceeds to step S123. On the other hand, if the fluctuation amount of the power supply voltage is equal to or greater than the threshold value, it is determined that an abnormality has occurred in the DC power supply 5 by the time when the output shaft portion 75 reaches the target position from the correction start position, and the process proceeds to step S424.

In step S123, correction information is stored as appropriate based on an assumption that all the detected relative position signals are regarded as appropriate signals. After storing the appropriate correction information, the control regarding the correction is ended. On the other hand, in step S424, it is considered that the detected relative position signal includes an inappropriate signal, and the correction information is deleted, and the control regarding the correction is ended.

According to the above-described embodiment, the power supply voltage is checked while moving the output shaft portion 75 from the correction start position to the target position. Therefore, it is possible to determine whether the DC power supply 5 is operating normally while detecting the relative position signal. Therefore, it is possible to prevent the abnormality of the DC power supply 5 from affecting the correction, facilitating the improvement of the accuracy of the correction. Further, unlike the case where the power supply voltage is obtained at the timing when the relative position signal is detected, the interval for obtaining the power supply voltage can be set arbitrarily. Therefore, the power supply voltage can be obtained at the timing when the relative position signal is not being detected. Accordingly, when the relative position signal is not detected at the timing when the relative position signal should be (i.e., is supposed to be) detected, it is possible to determine whether or not the fluctuation of the power supply voltage has an influence (i.e., has affected to such non-detection of the relative position signal).

Figure 10:
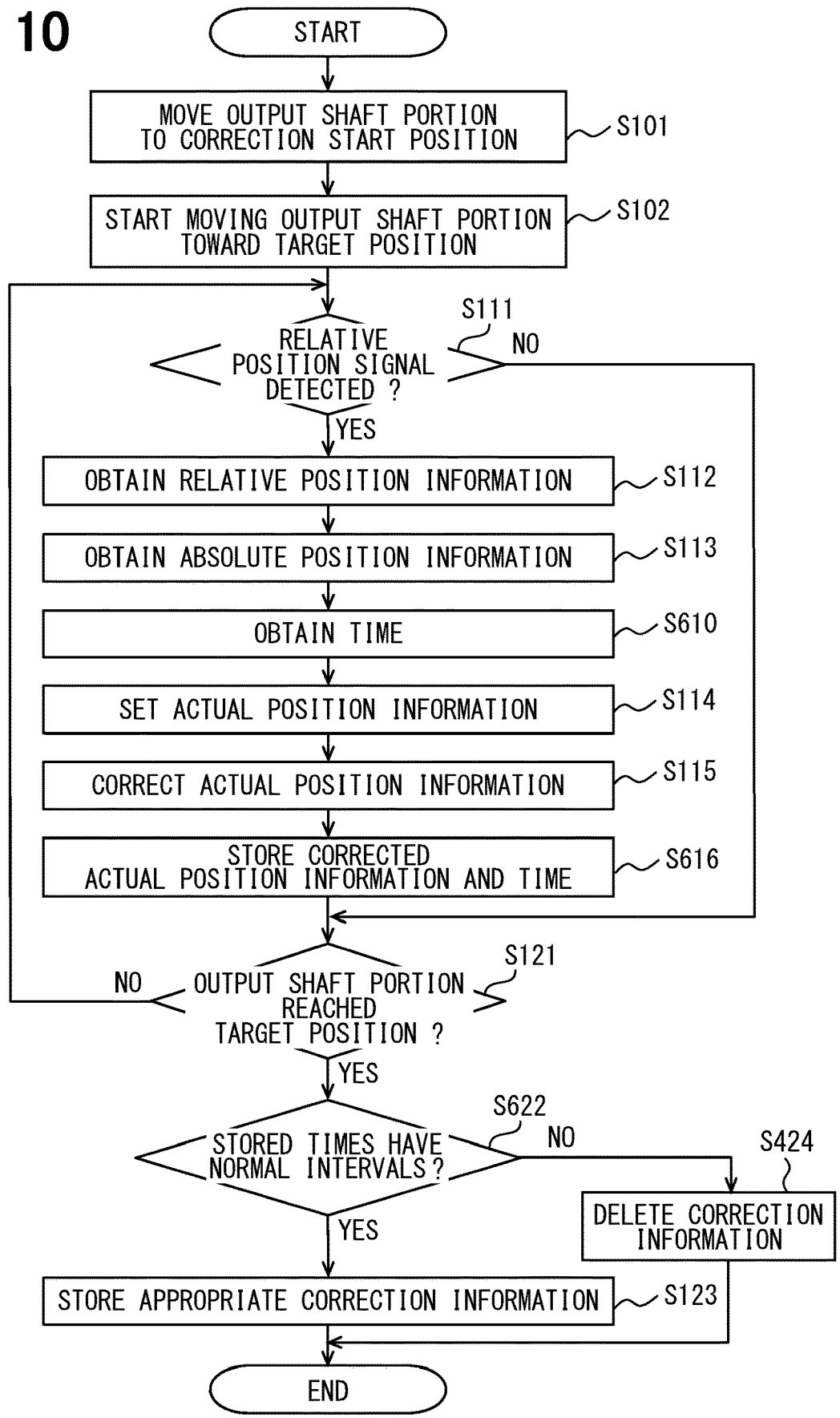
FIG. 10 is a flowchart of correction control of the motor system according to a sixth embodiment.

Sixth Embodiment (FIG. 10)

The sixth embodiment is a modification on top of preceding embodiments serving a base thereof. In the present embodiment, it is determined whether or not the time interval at which the relative position signal is obtained is a normal interval, and such determination is reflected to the correction.

In FIG. 10, when a relative position signal is detected in step S111, the relative position information is obtained in step S112, the absolute position information is obtained in step S113, and time information ("TIME" in FIG. 10) is obtained in step S610. The time information is information indicating the timing at which the relative position signal is detected. After obtaining the time information, the actual position information is set in step S114, and the actual position information is corrected in step S115. After correcting the actual position information in step S115, the process proceeds to step S616.

In step S616, the corrected actual position information and time are stored. At this time, the corrected actual position information and the information on the time when the relative position signal was obtained are stored as a set (i.e., in combination). After storing the corrected actual position information and the time, the process proceeds to step S121, and it is determined whether or not the output shaft portion 75 has reached the target position. If the output shaft portion 75 has reached the target position, the process proceeds to step S622. On the other hand, when the output shaft portion 75 has not reached the target position, the process returns to step S111.

In step S622, it is determined whether or not the stored times have normal intervals (i.e., times stored are interposed with normal intervals). Here, the time interval (i.e., reference interval) used for the determination is a time interval from one detection of the relative position signal to the next detection of the relative position signal. Since the time is obtained and stored each time the relative position signal is detected, interval determination involves a plurality of (stored) times (and the intervals derived therefrom). If the time interval is appropriate, it is determined that the relative position signal has been properly obtained, and the process proceeds to step S123. On the other hand, when the time interval is inappropriate, it is determined that the relative position signal has not been properly obtained, and the process proceeds to step S424. Here, when the time interval is inappropriate, there are cases where the time interval is too short and too long as compared with the appropriate interval.

In step S123, all the detected relative position signals are regarded as signals obtained at appropriate timing, and correction information is stored as appropriate. After storing the appropriate correction information, the control regarding the correction is ended. On the other hand, in step S424, it is considered that the detected relative position signals include an erroneous signal obtained at an inappropriate timing, and the correction information is deleted, and the control regarding the correction is ended.

According to the above-described embodiment, it is determined whether or not the time interval at which the relative position signal is obtained is a normal time interval, and such determination is reflected to the correction. Therefore, it can be determined whether the relative position signal can be obtained at an appropriate timing. Therefore, it is possible to prevent/suppress erroneous correction based on an erroneous signal detected at a false timing (i.e., at a supposed-to-be-wring timing, which should never be appropriate). Alternatively stated, it may be possible to prevent the correction by erroneous relative position information, since the relative position signal is not detected at a correct/appropriate timing, which indicates or strongly suggests that the relative position information derived therefrom is erroneous/wrong.

Other Embodiments

The present disclosure in the specification, the drawings, and the like is not limited to the embodiments described above. The disclosure encompasses the exemplified embodiments and modifications by those skilled in the art based thereon. For example, the present disclosure is not limited to the combinations of components and/or elements shown in the embodiments. The present disclosure may be implemented in various combinations. The present disclosure may have additional portions that may be added to the embodiments. The present disclosure encompasses omission of components and/or elements from the embodiments. The present disclosure encompasses the replacement or combination of components and/or elements between one embodiment and another. The disclosed technical scope is not limited to the description of the embodiments. It should be understood that some of disclosed technical ranges are indicated by description of claims, and includes every modification within the equivalent meaning and the scope of description of claims.

The present disclosure in the specification, drawings and the like is not limited by the description of the claims. The present disclosure in the specification, the drawings, and the like encompass the technical ideas described in the claims, and further extend to a wider variety of technical ideas than those in the claims. Therefore, various technical ideas can be extracted from the present disclosure of the specification, the drawings and the like without being limited to the description of the claims.

The control device and the method thereof described in the present disclosure may be realized by a dedicated computer configuring a processor programmed to execute one or a plurality of functions embodied by a computer program. Alternatively, the device and the method described in the present disclosure may be implemented by a dedicated hardware logic circuit. Alternatively, the device and the method described in the present disclosure may be implemented by one or more dedicated computers configured by a combination of a processor executing a computer program and one or more hardware logic circuits. The computer programs may be stored, as instructions to be executed by a computer, in a tangible, non-transitory computer-readable medium.

What is claimed is:

1. A motor control device for controlling a drive of a DC motor which is interlocked with an output shaft portion of an actuator, the motor control device comprising:
   a relative position obtainer (i) detecting current fluctuations when switching a connection between a commutator and a brush in the DC motor or when rotating the DC motor, and (ii) then obtaining relative position information of the output shaft portion;
   an absolute position obtainer obtaining absolute position information of the output shaft portion using a potentiometer;
   an actual position setter setting actual position information of the output shaft portion based on one of the absolute position information and the relative position information; and
   an actual position corrector correcting the actual position information based on at least one type among two types of information including (i) at least one piece of absolute position information and (ii) the relative position information.

2. The motor control device according to claim 1, wherein the actual position setter sets the actual position information using the absolute position information, and
   the actual position corrector corrects the actual position information using the relative position information.

3. The motor control device according to claim 2, wherein the actual position corrector corrects the actual position information by adding a difference between the absolute position information and the relative position information to the actual position information.

4. The motor control device according to claim 3 further comprising:
   a storage storing a characteristic map showing a relationship between a voltage of the potentiometer and the position information of the output shaft portion, wherein the storage stores a corrected map indicating a relationship between the voltage of the potentiometer and the corrected actual position information.

5. The motor control device according to claim 4, wherein the storage stores an initial map which is the characteristic map before correction of the actual position information and the corrected map.

6. The motor control device according to claim 1 further comprising:
   a driver capable of driving a plurality of DC motors, wherein
   the driver stops driving remaining DC motors while the relative position obtainer obtains the relative position information of one of the plurality of the DC motors.

7. The motor control device according to claim 1 further comprising:
   an abnormality determiner determining whether or not there is an abnormality in the absolute position information or the relative position information, wherein
   when the abnormality determiner determines that there is an abnormality, the actual position corrector corrects the actual position information using the absolute position information or the relative position information at the timing when the abnormality occurs.

8. The motor control device according to claim 7 further comprising:
   a timer counting a passage of time, wherein
   when the abnormality determiner determines that there is an abnormality, the actual position corrector does not correct the actual position information using the absolute position information or the relative position information at a timing of when the abnormality occurs, the timing being obtained by using the timer.

9. The motor control device according to claim 7 further comprising:
   a voltage obtainer obtaining a voltage in a DC power supply for driving the DC motor, wherein
   when a fluctuation amount of the voltage obtained by the voltage obtainer is equal to or more than a threshold value, the abnormality determiner determines that the relative position information at such timing is abnormal.

10. The motor control device according to claim 7, wherein
    the output shaft portion has one end of a movable range set at an set at an abutment position,
    the relative position obtainer obtains at least the relative position information at the abutment position,
    the absolute position obtainer obtains at least the absolute position information at the abutment position,
    the actual position setter sets the actual position information of the output shaft portion at the abutment position, and
    the actual position corrector corrects the actual position information at the abutment position.

* * * * *